Patented Aug. 7, 1945

2,381,495

UNITED STATES PATENT OFFICE 2,381,495

PROCESS FOR TREATING PLASTIC COMPOSITIONS

Frank W. Hall, Brackenridge, Pa., assignor to Pittsburgh Plate Glass Company, Allegheny County, Pa., a corporation of Pennsylvania No Drawing. Application March 26, 1941, Serial No. 385,309

4 Claims. (Cl. 154—2)

The present invention relates to plastic compositions and more particularly to processes for applying protective films to the surfaces of organic plastic materials.

One object of the invention is the provision of a process by means of which an organic plastic material may have applied thereto abrasion resistant coatings.

A second object of the invention is to provide a process for applying hard coatings to organic plastic materials pressed or molded to non-planar forms.

Other objects and advantages of the invention will be more apparent from the following detailed description of certain preferred embodiments thereof.

With the recent development of transparent, organic plastic materials possessing sufficient clarity and strength to render them available for use as glass substitutes and the like, there has been considerable research in an effort to provide for these materials a greater resistance to mechanical deterioration. Where these plastics, including cellulose derivatives, vinyl esters, polymerized esters of acrylic acid and in particular the methacrylates, have been polymerized to a higher degree than ordinary, or have been admixed with lesser amounts of modifying agents, to increase their hardness, there has been too great an increase in their brittleness to permit formation and use in sheet form. Other attempts to alter the surface characteristics of the organic plastics themselves have not been successful.

It has been proposed to apply a coating of a resinous material which is harder than the basic plastic to the surfaces of the plastic. Considerable difficulty has been experienced, however, in forming a uniform coating over the plastics. Ordinary coating methods have not been completely satisfactory for the intended purpose where the plastic is in sheet form and where the plastic is bent, a practical means of applying a coating film thereto has not heretofore been known.

Briefly stated, the present invention contemplates the formation of resin films upon thin sheets of a plastic material and the application of the coated plastic sheets to a basic form of plastic material similar in composition to that of the thin sheeting.

A resin which in its final state will be harder than the base plastic to be treated is taken in an initial stage of formation and applied as a coating film to thin flexible sheets of plastic similar in nature to the base plastic. The thin sheets of plastic may be obtained with smooth, regular surfaces, particularly adapted for the formation thereon of uniform films in ordinary coating apparatus. The coated plastic sheets are superposed upon a plate of plastic material with the coated sides of the sheets away from the plate and the assembly is subjected to heat and pressure. The pressing operation not only unites the layers of plastic but also changes the resin films on the covering sheets into a hard, insoluble, infusible state. This transformation in the resin films is accomplished either by additional polymerization or condensation thereof, depending of course, upon the nature of the resin employed.

The described method of improving the resistance of organic plastics to surface deterioration is particularly applicable to the treatment of plastics, pressed or molded to non-planar forms. It will be clear that the formation of a hard resin film on flat plastic prevents subsequent bending or molding of the coated plastic for such manipulation will rupture the resin film. By pressing or molding the heavier, base plate of plastic to the desired form initially, it is a relatively simple task to shape a light plastic sheet thereto. Where the light plastic sheet is coated with a resin film, which film is in an intermediate state of formation, the bending operation does not disrupt the resin film. Thereafter, heating and pressing unites the plastic layers and converts the resin film to a hard, infusible, insoluble state.

The following examples are illustrative of my invention:

*Example I*

An intermediate product of the conjoint polymerization of methyl methacrylate and itaconic acid ester is dissolved in a suitable solvent, such as xylol, and the solution is applied as a uniform film to thin sheets of methyl methacrylate. The methyl methacrylate sheets are sufficiently thin that they may be bent or shaped without difficulty. Cast or molded sheets of methyl methacrylate approximately 0.075 of an inch in thickness are commercially available and are suitable for use in the proposed process. The sheets may be pressed between highly polished plates to render their surfaces more homogeneous and smooth before they are coated, although this treatment is not essential in all instances.

The applied resin film can vary in thickness within considerable limits. It is preferred, however, in the interests of economy, that the coating film be kept at a minimum thickness. Under ordinary conditions a film of from 0.0002–0.0004 of an inch in thickness will provide ample surface protection of the final product. It is quite possible that an even thinner film will be satisfactory but apparatus limitations have prevented their formation or if they have been obtained it has not been possible to measure them.

The coated sheets are placed upon one or both sides of a plate of methyl methacrylate with the coated sides of the sheets away from the plate. Heat and pressure are applied to the assembly to bond the methyl methacrylate layers together and to complete polymerization of the resin coating. A temperature of approximately 275° F. and a pressure of about 600 pounds per square inch, maintained for approximately 30 minutes, will be sufficient for these purposes. The final operation is conducted in a heated press, having polished platens, in order that the resulting plastic will have a smooth uniform surface. The surface of the plastic composition is hard, infusible and insoluble and exhibits an improved resistance to mechanical deterioration.

*Example II*

A sheet of methyl methacrylate, approximately 0.075 of an inch in thickness, is coated with a uniform film of a fusible, intermediate polymer of allyl methacrylate dissolved in xylol. The coating layer is approximately 0.0002 of an inch in thickness. The coated sheets are placed upon opposite sides of a bent plate of methyl methacrylate with the coated sides of the sheet away from the plate. Because the resin film is in an intermediate stage of formation the methyl methacrylate sheet may be bent without rupture of the film. Heat and pressure sufficient to bond the methacrylate layers together and to complete polymerization of the resin coating are applied to the assembly. A pressure of about 900 pounds per square inch and a temperature of approximately 275° F. maintained for 40 minutes will be sufficient for these purposes. The resultant plastic composition is colorless, transparent and has a hard, infusible, and insoluble surface which strongly resists mechanical deterioration.

*Example III*

Sheets of vinyl acetal coated with thin films of partially polymerized, fusible diallyl phthalate were united to a plate of vinyl acetal resin in the manner described in Example II, and a plastic composition having a hard, wear-resistant surface was thereby secured.

An urea-formaldehyde or a phenol-formaldehyde, colorless resin may be used to coat the plastic sheet. These resins are, during an initial stage of their formation, soluble and fusible, thus permitting ready formation of films thereof and they undergo a condensation on the application of heat and pressure with an accompanying change to an insoluble, infusible form. The exact degree of heat and pressure necessary to accomplish this change in physical characteristics will be determined by the nature of the resin employed.

Numerous other examples of types of film-forming materials, including the unsaturated esters of unsaturated acids, such as allyl, methallyl, 2-chloroallyl, and crotyl acryates or methacrylates, alpha alkyl or apha substituted acrylates, unsaturated esters of unsaturated alcohols and polycarboxylic acids are suited for coating soft plastics. These materials are enumerated and details of their preparation are given in the application of Irving E. Muskat, Franklin Strain and Maxwell A. Pollack, Serial No. 310,032, filed December 19, 1939.

Other polymerized acrylates and methacrylates may be substituted for the methyl methacrylate in the base plate and applied sheeting. Those thermoplastic polymers which are sufficiently flexible, transparent and stable to light or heat to permit their use in lieu of glass, and which may be formed into sheets or plates by extrusion or molding methods, also may be coated or surfaced in accordance with my invention. For example, cellulose derivatives and various vinyl polymers, such as polyvinyl acetate, polyvinyl chloride, polyvinyl butyrate, polyvinyl butyral, polystyrene or other fusible or thermoplastic polyvinyl halides or esters of saturated aliphatic acids may be used as base materials.

It will at once be obvious that various modifications in the compositions of the resins forming the coating layer and the plastic material of the base plates and the conditions under which they are assembled are possible without departing from the spirit of the invention or the scope of the appended claims.

What I claim is:

1. A method of forming an abrasion-resistant surface of uniform thickness upon a body comprising a thick, stiff layer of plastic of relatively low abrasion resistance and having a non-planar surface, which method comprises coating a thin flat relatively flexible sheet of plastic capable of adhering to said body with a thin film of plastic, which can be polymerized into a hardened infusible abrasion resistance state, said film being in an intermediate state of polymerization, shaping said sheet to the contours of said non-planar surface, adhering the sheet to the surface with the film facing outwardly and hardening the film in situ.

2. A method of forming an abrasion-resistant film of uniform thickness upon a body comprising a thick stiff base layer of plastic of relatively low abrasion resistance, which base also has a non-planar surface, which method comprises coating a thin, flat relatively flexible sheet of plastic capable of bonding to said base layer with a thin film of plastic which can be polymerized into a hard abrasion resistant infusible state, said film being in an intermediate state of polymerization, shaping and adhering the film to the surface with the film facing outwardly and hardening the film in situ, the film being of a thickness ranging from .0002 to .0004 inch.

3. A process of manufacturing a body having a non-planar surface, the surface being coated with a film of resin of slight but uniform thickness, and of high resistance to abrasion, the body comprising a base which is thick and incapable of substantial bending without mechanical damage to the said film and further being of low resistance to abrasion, which process comprises forming the base in its permanent shape, coating a thin flat flexible sheet of plastic of a composition approximately that of the base with a film of plastic capable of setting to a hard infusible state, but being in an intermediate state of hardening, so that it can be flexed without damage, then shaping the sheet to the contours of said base, adhering the sheet to the base and hardening the film in situ.

4. A process of manufacturing a body having a non-planar surface, the surface being uniformly coated with a film of resin of high resistance to abrasion, the body comprising a base of methyl methacrylate resin, which is thick and incapable of substantial bending without mechanical damage to the film and further being of low resistance to abrasion, which process comprises forming the base to its permanent shape, coating a thin flat flexible sheet of plastic of a composition approximating that of the body with a film of plastic comprising an unsaturated compound containing a plurality of unsaturated polymerizable groups separated by ester linkages and being capable of hardening to an infusible insoluble state, said plastic at the time of application being in an intermediate state of hardening so that it can be applied without damage, shaping and adhering the sheet to the surface and polymerizing the plastic of the film to its final state.

FRANK W. HALL.